United States Patent [19]
Nishida et al.

[11] Patent Number: 4,580,892
[45] Date of Patent: Apr. 8, 1986

[54] CONTACT PRINTING APPARATUS

[75] Inventors: Fumihiko Nishida; Masao Muraki, both of Kyoto, Japan

[73] Assignee: Dainippon Screen Mfg. Co., Ltd., Kyoto, Japan

[21] Appl. No.: 622,572

[22] Filed: Jun. 20, 1984

[30] Foreign Application Priority Data

Jun. 29, 1983 [JP] Japan .................................. 58-119227
Jun. 29, 1983 [JP] Japan ............................ 58-101762[U]

[51] Int. Cl.⁴ ............................................ G03B 27/04
[52] U.S. Cl. ..................................................... 355/95
[58] Field of Search ................................... 355/95, 96

[56] References Cited

U.S. PATENT DOCUMENTS

| | | | |
|---|---|---|---|
| 2,290,292 | 7/1942 | Neu | 355/95 |
| 3,639,056 | 2/1972 | Gerson | 355/95 |
| 4,142,794 | 3/1979 | Trump | 355/95 |
| 4,287,564 | 9/1981 | Swift et al. | 355/95 |

FOREIGN PATENT DOCUMENTS

| | | |
|---|---|---|
| EPA10017144 | 10/1980 | European Pat. Off. . |
| 717821 | 11/1954 | United Kingdom . |
| 1250464 | 10/1971 | United Kingdom . |
| 1320704 | 6/1973 | United Kingdom . |
| 1362780 | 8/1974 | United Kingdom . |
| 1390436 | 4/1975 | United Kingdom . |

Primary Examiner—Monroe H. Hayes
Attorney, Agent, or Firm—Brumbaugh, Graves, Donohue & Raymond

[57] ABSTRACT

An apparatus comprising a first conveyor mechanism for reciprocating movements on a straight line and a second conveyer mechanism for reciprocating movements in a direction orthogonal to the moving direction of the first conveyer mechanism, necessary positioning being carried out by moving an original film in both X- and Y-directions in relation to a photosensitive material, a printing operation being carried out on a table by bringing the original film into contact with the photosensitive material, and the original film being fixed to the first conveyer mechanism.

9 Claims, 12 Drawing Figures

CONTACT PRINTING APPARATUS

BACKGROUND OF THE INVENTION

This invention relates to an apparatus for printing or exposing an image or images of an original plate on a photosensitive material such as film, presensitized plate, etc.

In graphic art works, it is often required to print one image repeatedly and successively onto discrete areas of a sheet of photosensitive materials from an original negative/positive (hereinafter defined as "original film"). For such purpose, an apparatus so-called "composer" is generally used, which is well-known to use for step-and-repeat exposure operations. An original film holder by which an original film is fixedly placed is moved to desired positions on a sheet of photosensitive materials, at which a contact exposure is made. The original film holder is required to be larger in size than an original film so as to efficiently hold the original thereon. As the result, for example, in the event that two relatively large-sized images are discretely printed side by side on a sheet of photosensitive materials, or in the event of printing from an original film with non-standard size, it is unavoidable to change the holder to another one suitable to the original film size, resulting in a larger-sized apparatus as a whole and in much expensive.

It is also required in graphic art works to print several images of different original films on a sheet of photosensitive materials. In such operation it is indeed possible to carry out the printing operation by using a composer whereby an original film is automatically replaced with another one, however, this unavoidably requires the large-sized apparatus which is expensive.

In order to carry out the foregoing kinds of printing operations, a so-called vacuum printing apparatus has customarily been used wherein the original film is manually positioned. Such operations in the prior arts are much complicated, the accuracy thereof being not sufficiently obtained, and increasing demands for automating graphic art works are not met under the present situation.

SUMMARY OF THE INVENTION

It is, therefore, a principle object of the present invention to provide a contact printing apparatus which enables the printing of various sized original films with simpler operations.

It is another object of this invention to provide a contact printing apparatus of compact in size as well as simplified in construction thereof.

It is another object of this invention to provide a contact printing apparatus which assures high degree of accuracy in the step-and-repeat operations.

Other objects of the invention will be evident from the description hereinafter presented.

Thus, in order to accomplish the foregoing objects, the present invention provides an apparatus for printing images on discrete areas of a photosensitive material which comprises a first conveyer mechanism for moving at least an original film reciprocatively in first linear directions; a first driving means for driving the first converyor mechanism; second conveyer mechanism for moving the first conveyer mechanism reciprocatively in second linear directions orthogonal to the first directions; a second driving means for driving the second converyor mechanism; a table for supporting the photosensitive material; and lighting means opposite to the table for exposing the photosensitive material. The original film is positioned relative to the photosensitive material at a predetermined area where both the photosensitive material and the original film are contacted for an exposure. The first conveyer mechanism comprises one belt member stretched between a pair of pulleys and running in a longitudinal direction, which exactly complies with the first directions, by the rotation of the pulleys. The first conveyer mechanism further comprises guide members which is provided so as to contact with both edges of the belt member.

The pulleys are rotatably supported on respective shafts thereof and allowed respectively to move in axial directions on the shafts, while the belt member is defined relative to the first directions. The guide member for defining the belt member preferably comprises a wheel rotatable in running directions of the belt member and in contact therewith. In order to effectively define the belt member, the guide members are preferably provided adjacent to the respective pulleys. The first conveyer mechanism is connected with the second conveyer mechanism, in which the connection therebetween is ensured by a ball screw and at least one bearing fixed to the first conveyer mechanism for moving the first conveyer mechanism along the ball screw, thus both the mechanisms are cooperative to move the original film in X-Y directions relative to the photosensitive material. The first conveyer mechanism is mechanically connected with a lifting mechanism movable in the vertical directions relative to the surface of the photosensitive material. Alternatively, the table is connected with a reciprocating mechanism for lowering the table relative to the first conveyer mechanism. The original film through which an exposure is given is positioned on the belt member relative to the photosensitive material or the table, and alternatively relative to the belt member itself.

The original film is directly fixed onto the belt member, and it is also applicable to use a transparent base sheet on which the original film is fixed, which the base sheet is fixed to the belt member, in case the original film is relatively small.

An advantageous feature of the present invention is that positioning of the original film relative to the photosensitive material is automatically performed independent of the diversity of the original film in size or shape, and particularly when various images are printed in discrete areas of a photosensitive material, printing operation can easily and correctly carried out.

Another advantageous feature of the present invention is that the whole surface of a photosensitive material can effectively be utilized.

Further features which are considered characteristic of the invention are set forth with particularity in the appended claims. For a better understanding of the invention, its operating advantages, and specific objects attained by its use, reference should be had to the accompanying drawing and descriptive matter in which there is illustrated and described preferred embodiments of the invention.

BRIEF DESCRIPTION OF THE DRAWINGS

In the accompanying drawings forming a part of this application, and in which like parts are designated with the same reference numerals or characters.

DESCRIPTION OF THE PREFERRED EMBODIMENTS

Referring now to the accompanying drawings some of the printing apparatus embodying this invention are described hereunder.

Figure 1:
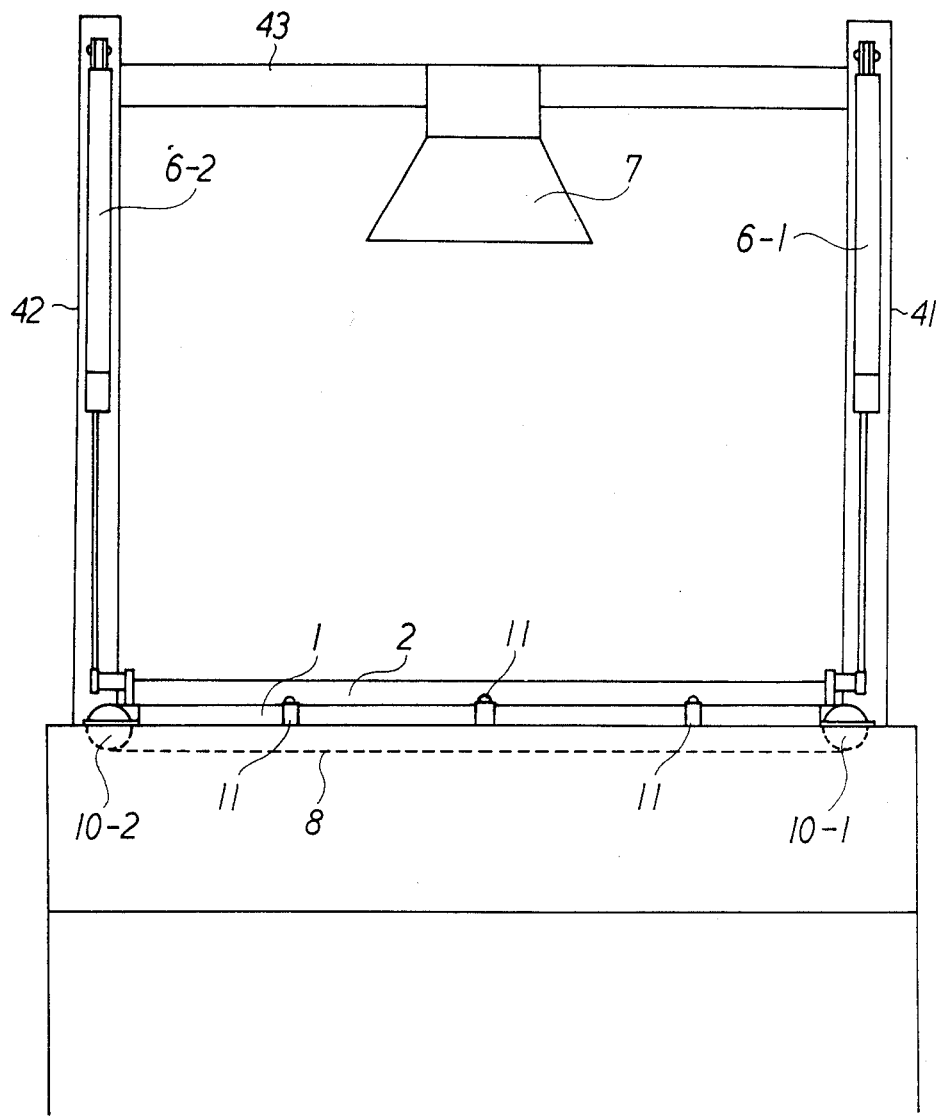
FIG. 1 is a front view showing an outline of the printing apparatus in accordance with this invention.
Figure 2:
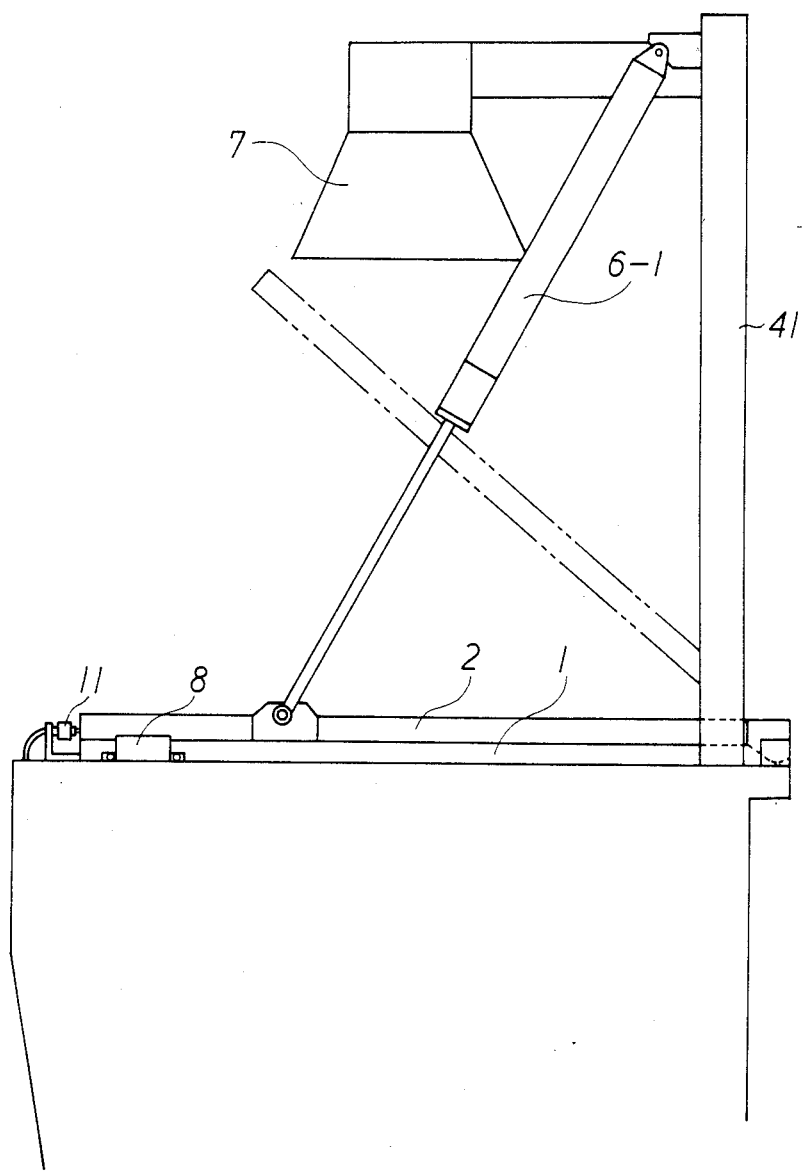
FIG. 2 is a side view of FIG. 1.
Figure 3:
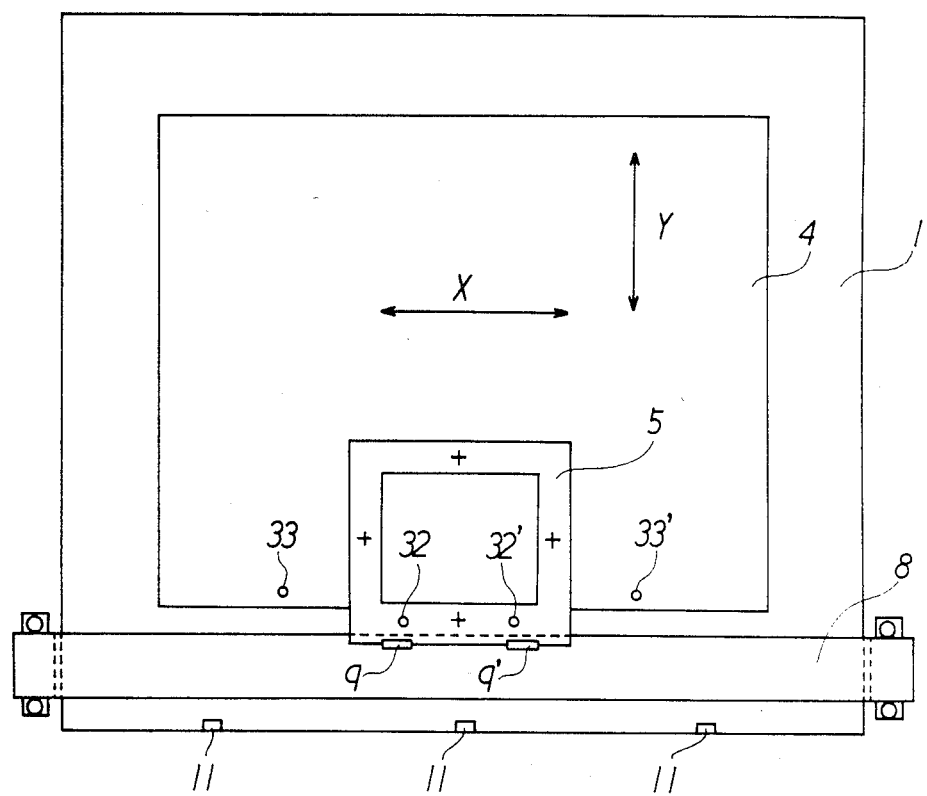
FIG. 3 is a plan view typically illustrating a substantial part of the printing apparatus in accordance with this invention.

In FIGS. 1, 2 and 3 respectively showing a front view, a side view and a plan view of the outline of the printing apparatus in accordance with this invention, the apparatus comprises a printing table (1), and a rectangular frame (2) inside of which a glass plate (3) is held with packing members (not illustrated) provided on the periphery thereof.

Respective lower ends of telescopic air cylinders (6-1) (6-2) are pivotably mounted on respective sides of the frame body (2), while the other respective ends of the cylinders (6-1) (6-2) are pivotably mounted on the respective upper ends of vertical members (41) (42) which are connected by a lateral member (43). Following the symmetrical telescopic motions of the cylinders (6-1) (6-2), the frame body (2), hence the glass plate (3), makes on open-close movements. Near the front end of the table (1), there is provided an endless steel belt (8) stretching between a pair of pulleys (10-1) (10-2), on which an original film (5) is fixed by means of adhesive strips (9) (9') or the like. Positioning of the original film (5) onto the steel belt (8) is performed by inserting a pair of positioning pins (32) (32') into a pair of holes provided on the original film (5), then the original film (5) is fixed on the steel belt (8) by the strips (9) (9'). The original film (5) fixed on the steel belt (8) is moved in the X-direction to a desired position, by controlling the rotation of the driving pulley (10-1). Air nozzles (11) are arranged near the front edge of the table (1), through which compressed air is blown along the surface of the table, whereby the original film (5) is lifted, while it is moved to a desired position, so as to prevent it from touching a photosensitive material (4). After the original film is moved to a predetermined position at which an exposure is made, the rectangular frame (2), hence the glass plate (3), is swung down on the table (1), thus all the original film (5), the photosensitive sheet (4) and the steel belt (8) are held between the table (1) and the glass plate (3).

The photosensitive sheet (4) is positioned on the table (1) by inserting a pair of positioning pins (33) (33') into corresponding holes provided on the sheet (4) and is fixed by means of adhensive strips (not shown), then the original film (5) is mounted on the steel belt (8) and positioned in the same manner as mentioned above. The air remaining in the space between the printing table (1) and the glass plate (3) is exhausted by a vacuum suction source (not illustrated) so as to bring the photosensitive sheet (4) into tight contact with the original film (5). The thickness of the steel belt (8) is desired to be as thin as possible in view of the necessity of contact between the original film (5) and the photosensitive sheet (4), and more desirable to be not exceeding 0.2 mm. A light source (7) is provided above the table (1), which is of a metal halide lamp or a mercury lamp emitting such light as ultraviolet light or blue light.

Figure 4:
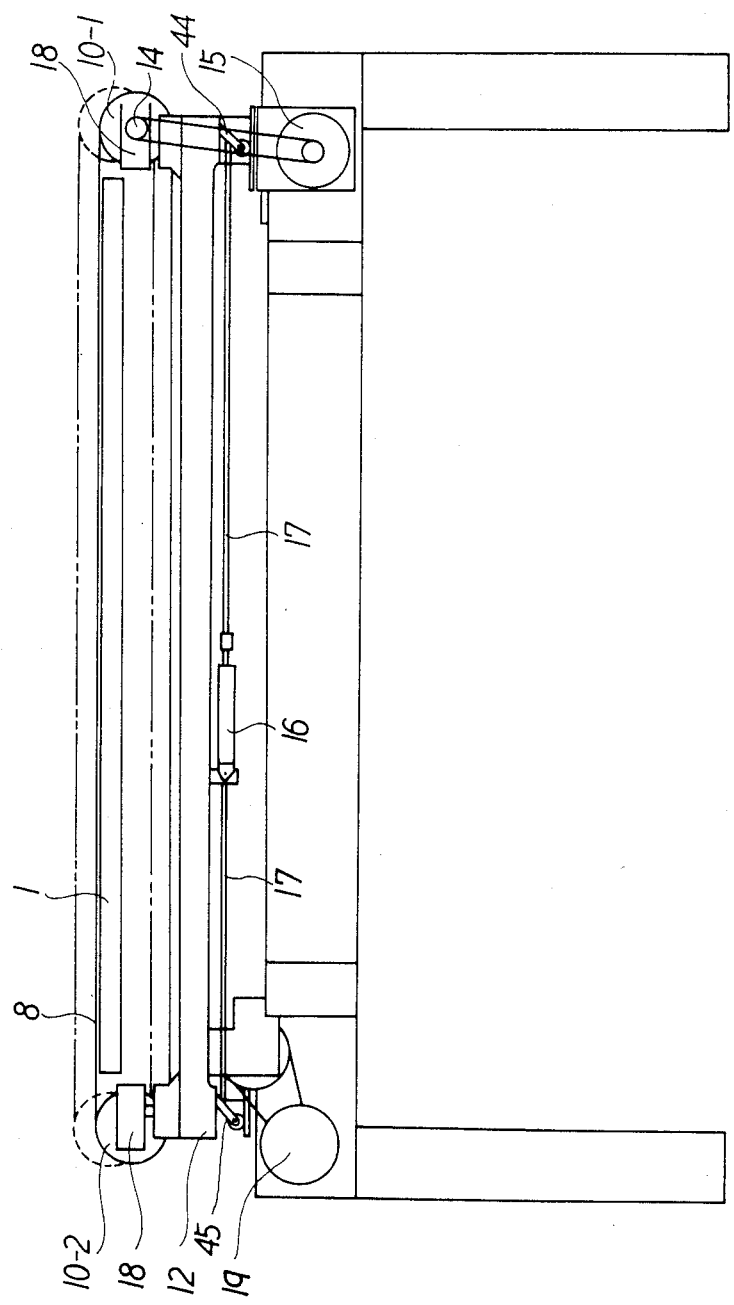
FIG. 4 is a segmentary view of FIG. 1 typically illustrating the printing apparatus in accordance with this invention.
Figure 5:
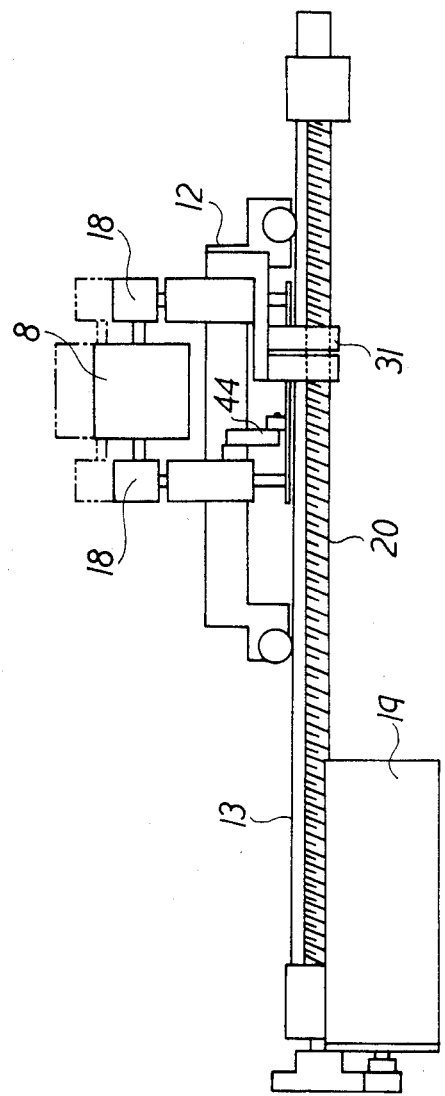
FIG. 5 is a side view of FIG. 4.
Figure 6:
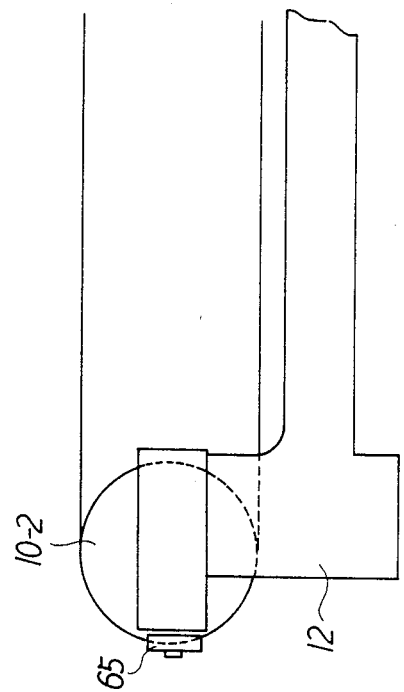
FIG. 6 is a front view showing an embodiment of the belt positioning system included in the printing apparatus in accordance with this invention.

Referring to FIGS. 4 and 5, there is provided a bed (12) horizontally movable in the Y-direction, and a pair of guide rails (13) fixed on both sides of the table (1), along which the bed (12) is moved. A timing pulley (14) whose shaft is common to the pulley (10-1) and a driving shaft of a pulse motor (15) are mechanically connected therebetween through a timing belt, thus by driving the pulse motor (15) the belt (8) moves in the X-direction. An assembly comprising a pair of pulleys (10-1) (10-2), the steel belt (8) and a guide member (18) for the steel belt (8) (hereinafter defined as the first conveyer mechanism) is slidably moved in the Y-direction, by which the original film (5) is positioned in the X-direction.

The driving mechanism for the belt (8) is mechanically connected to an air cylinder (16) via a crank system (44) (45) and respective rods (17) connect therebetween. Thus, the first conveyer mechanism is lifted, together with the motor (15) which is fixed to the first conveyer mechanism, up to the position indicated by the two-dot chain line so that the original film (5) is carried at this lifted level.

Figure 11:
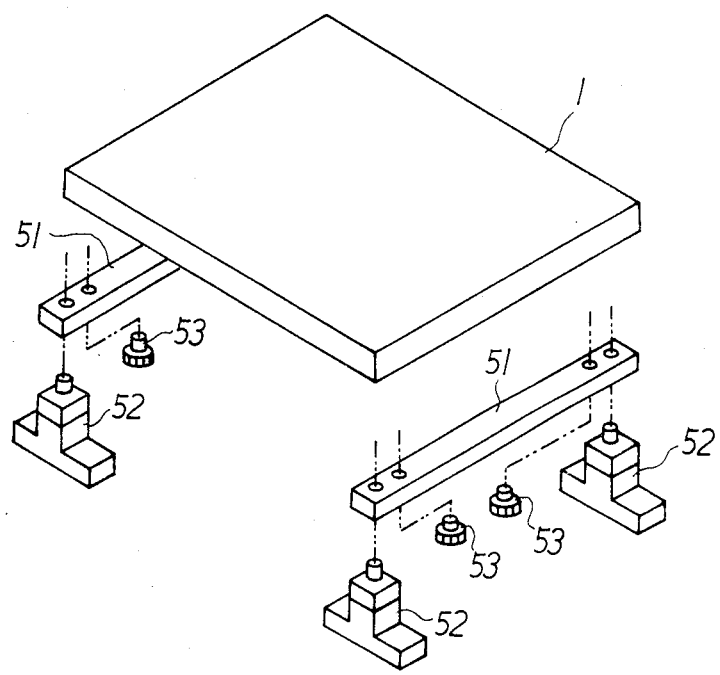
FIG. 11 is a perspective view of a table.

In an embodiment shown particularly in FIG. 4, the movement of the original film (5) is performed as the first conveyer mechanism is lifted, relative to the table (1), however, the same purpose can be attained by lowering the table (1) relative to the upper steel belt (8). FIG. 11 shows a detailed construction of such another embodiment of the table (1). In this embodiment there are provided air cylinders (52) at respective corners of the table (1) and a pair of supporting members (51) which lie between the cylinders and the table and are fixed to the table by screws (53). The table (1) is raised or lowered, while keeping its upper surface horizontal, by symmetrically actuating respective air cylinders (52).

Referring back to FIG. 5, a ball screw bearing (31) for engaging with a ball screw (20), is provided under the bed (12), and in response to the rotation of the ball screw (20) which is given by a pulse motor (19), the bed (12) slides in the Y-direction along the guide rail (13) extending in parallel with the surface of the table (1). Thus another assembly comprising the ball screw (20), the pulse motor (19), the bed (12) and the bearing (31) provided for engagement with the ball screw (20) (hereinafter defined as "second conveyer mechanism") moves the first conveyer mechanism supported on the bed (12) slidably in the Y-direction. Consequently, the original film (5) can freely slide in both X- and Y-directions on the table (1) by means of the first and the second conveyer mechanism.

Figure 7:
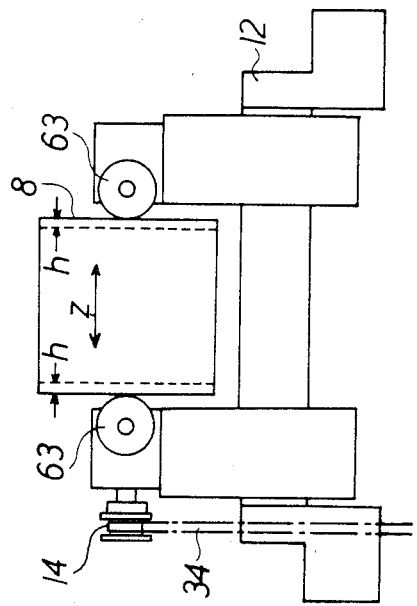
FIG. 7 is a right side view of FIG. 6.
Figure 8:
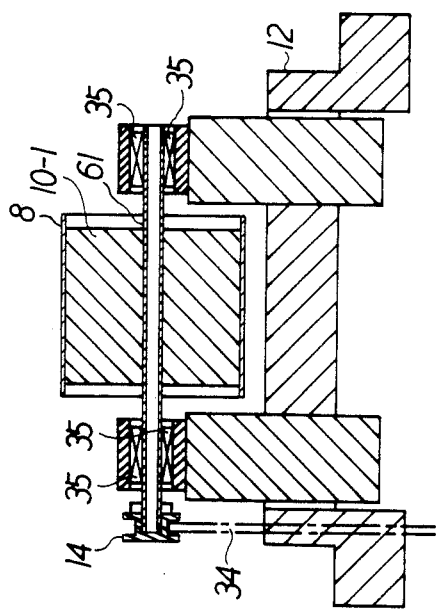
FIG. 8 is a sectional view taken on line A—A of FIG. 6.

Referring to FIGS. 6 through 9, which respectively show the positioning system of the original film (5), the timing pulley (14) is rotatably mounted on one end of the driving shaft (61) of the driving pulley (10-1), and the pulley (10-1) is driven by means of the timing belt (34) stretched over between the timing pulley (14) and the shaft of the driving motor (15). The width of the driving pulley (10-1) and the driven pulley (10-2) is smaller than that of the steel belt (8) by 2h as shown in FIG. 7. The pulleys (10-1) (10-2) are rotatable as well as movable in the axial direction by means of linear ball bearings (35). On the other hand, the width of the timing pulley (14) is larger than that of the timing belt (34), so the tension of the timing belt (34) does not interfere with the movement of the pulley (10-1) in the axial direction when the driving pulley (10-1) is driven. Guide members (63) (65) are respectively provided adjacent to the pulleys (10-1) (10-2), which are arranged in contact with both sides of the stretched belt, and it is preferred to use a wheel member rotatable in the running direction of the belt (8). The wheel guides (63) (65) may be arranged at a position other than the contacting portion between the belt (8) and the pulleys (10-1) (10-2). However, when the belt (8) is relatively thin and of a material which is easily bent, it is preferred to arrange the wheel guides (63) (65) at the contacting portion.

Figure 9:
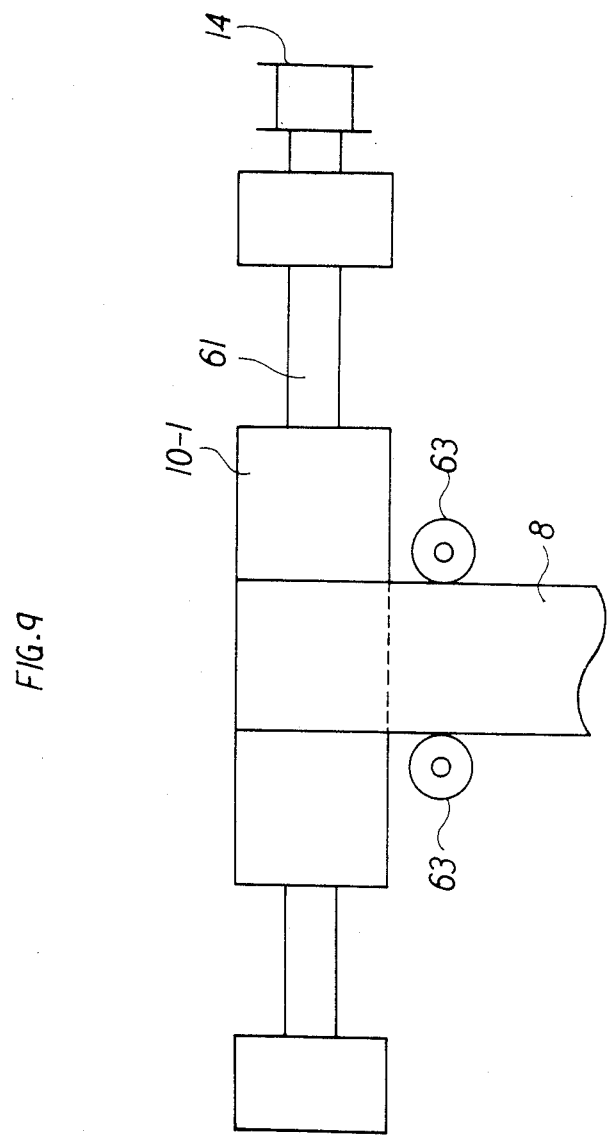
FIG. 9 is a partial plan view showing another mode of the belt positioning system.

When the belt (8) runs in the X-directions indicated in FIG. 3 by driving the pulley (10-1) for positioning the original film (5), if all the given conditions, e.g. the tension and the thickness of the belt, the surface roughness and the parallelism of the pulleys and so on should be completely adequate or compliable with the ideal ones, snaking is not caused in the belt. It is, however, practically impossible to meet all of the conditions as mentioned above, and thus snaking force in the Z-directions (FIG. 7) is produced, as the steel belt (8) runs in the X-directions. In this case, if the pulley (10-1) is fixed and is not allowed to move in its axial directions, the edges of the belt (8) would be pressed against the wheel members (63) (65) and finally the edges thereof will be damaged. On the other hand, in accordance with this invention, the respective shafts of the pulleys (10-1) (10-2) are movable in the axial directions by means of the linear ball bearings (35), the snaking force in the Z-directions is released or set off by the movement of the pulleys (10-1) in the reverse directions, and thus the edges of the belt (8) would not be pressed against the wheel guides (63) (65). In this connection, the movement of the original film (5), hence the running distance of the belt (8), in the X-directions does not exceed the whole width of the photosensitive sheet (4) at maximum so clearance h may not exceed 20 mm. In case the running distance of the belt (8) is relatively longer, the width of the respective pulleys (10-1) (10-2) may be wider as shown in FIG. 9 and respective pairs of the wheel guides (63) (65) are arranged not to interfere with the movements in the axial directions of the pulleys (10-1) (10-2).

Thus, even when the belt is thin, the edges thereof are not deformed or damaged by contact with the guide member. Furthermore, in spite of a quite simple structure, the snaking of the belt can be efficiently eliminated, resulting in the successful graphic art process which requires a high degree of accuracy in positioning the original plate.

Figure 10:
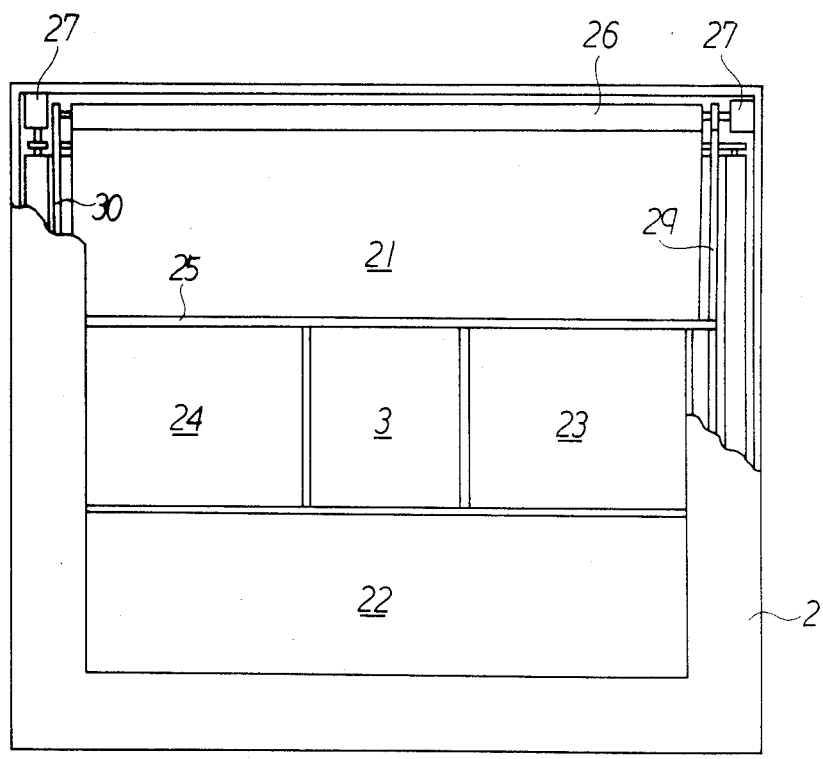
FIG. 10 is a plan view partially broken away showing an outline of a masking system.

Referring to FIG. 10, which shows a masking system for defining an exposure area, respective pairs of masks (21) (22); (23) (24) respectively define the longitudinal and lateral limitations of an exposure frame. These masks are extendable on the upper surface of the glass plate (3).

Respective leading ends of the masks (21) (22) (23) (24) are guided by respective guide members (e.g. guide member (25) for the mask (21)), while the other respective rear ends are fixed to respective winding rollers (e.g. roller (26) for the mask (21)), which are rotatably supported on respective shafts through a rotary spring (not shown) which always gives spring rotation in the winding direction. Pulse motors (27) are respectively connected with the respective shafts of the winding rollers. Respective leading ends of the guide members (e.g. the end (25)) are supported at both sides thereof by timing belts e.g. (29) (30), which are respectively stretched between opposite shafts of rollers.

Thus by controlling the revolution of the pulse motor (27), for example, the guide member (25) moves to a required position through the timing belts (29) (30), and the winding roller (26) rotates following the movement of the guide member (25), by which the mask (21) is stretched on the glass plate (3), hence the photosensitive material (4), for defining an exposure area at printing. As for the other masks (22) (23) (24), the same operation is performed in the same manner as above, and thus respective masks (21) (22) (23) (24) are individually positionable.

Now, the printing operation is performed as follows: First, various printing information, e.g. the printing areas exposure time, frame size for printing and so on, are input into an input unit (not illustrated) comprising a microcomputer, a NC unit or the like, and the photosensitive material (4) is positioned onto the table (1) by inserting a pair of projecting register pins (33) (33') (FIG. 3) into corresponding holes provided on the photosensitive material. The register pins (33) (33') are removed from the table (1) after fixing the photosensitive material (4) onto the table by means of vacuum suction and adhesive strips. Then the original film (5) is positioned on the steel belt (8) by inserting a pair of projecting register pins (32) (32') into corresponding holes provided on the original film, and is fixed thereon by means of adhesive strips (9) (9'). The register pins (32) (32') projecting from the table (1) are removed. Such a register pin system as shown in FIG. 3 is required to return back to the starting position when the original film is changed to another one during a step-and-repeat operation, since the starting positioning of the original film is made at the starting position.

Figure 12:
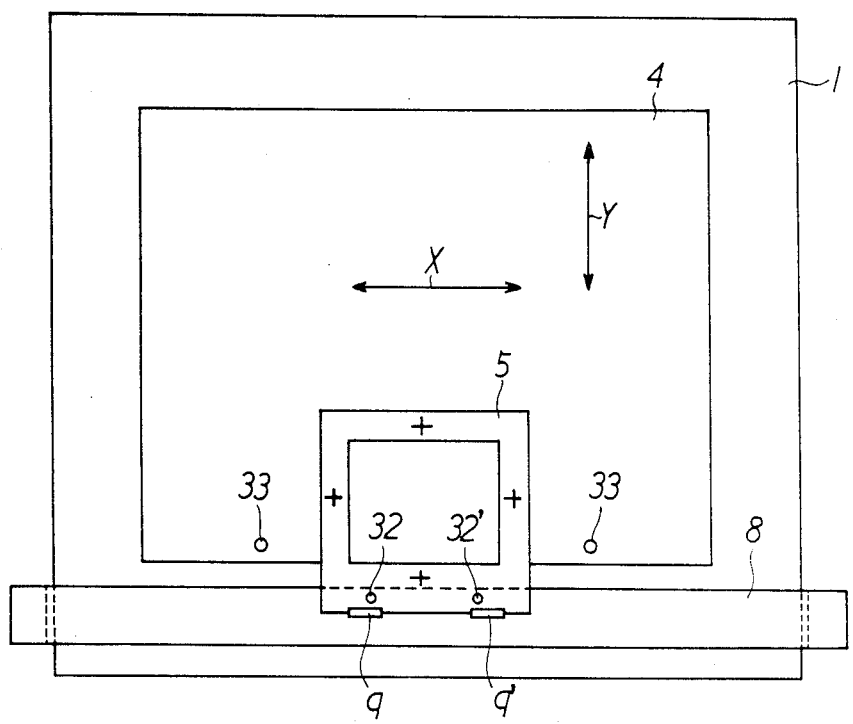
FIG. 12 is a plan view showing another embodiment of register pin system.

Another register pin system applicable for promoting printing performance, is shown in FIG. 12. A pair of projecting register pins (32) (32') are fixed on the steel belt (8), whose height projecting from the upper surface of the belt (8) is not higher than the thickness of the original film (5) to be positioned therethrough, and is less than about 1 mm. Ths system enables an easy change from the original film fixed on the belt (8) to another one independent of the position of the original film to be changed.

After completing the positioning of both the photosensitive material (4) and the original film (5), the printing operation is started by switching on the apparatus and is automatically performed as follows. First, the first conveyer mechanism is lifted up to the position by means of the crank system (44) (45) as shown in FIGS. 4 and 5, or the table (1) is lowered by means of air cylinders as mentioned referring to FIG. 11, and simultaneously compressed air is blown along the surface of the photosensitive material (4) through the nozzles (11) so that the original film (5) whose one end is fixed to the belt (8) is lifted by blown air, thereby the original film (5) being not brought into contact with the photosensitive material (4) during the movement thereof. While keeping said state, the pulse motors (15) (19) are driven in response to commands from the microcomputer or NC unit (not illustrated) so as to move the original film (5) in the X- and Y-directions. Thus positioning of the original film (5) to the predetermined position is carried out. Blowing of compressed air from the nozzles (11) is then stopped, and the first conveyer mechanism is lowered or the table (1) is raised, and then the air cylinders (6-1) (6-2) are actuated to close the rectangular frame (2).

Remaining air inside the air-tight space between the glass plate (3) and the table (1) is exhausted by means of a vacuum pump (not illustrated) so as to bring the original film (5) into tight contact with the photosensitive material (4). In the meantime, in response to commands from the microcomputer or NC unit, the respective masks (21) (22) (23) (24) are positioned to the respective predetermined positions to define an area to be exposed.

After completing the foregoing steps, the light source (7) is lighted to carry out the contact exposure. When completing the printing, the vacuum is released, and the frame body (2) is opened to repeat the following exposures at the following discrete areas in the same manner as mentioned above.

In a case where images of several original films are to be printed at one time, original films are respectively positioned on the belt (8) as mentioned referring to FIG. 12, and are respectively fixed thereon by adhesive strips, then an exposure is carried out at one time, thus the lighting/putting-out frequency of the light source (7) can be decreased.

Although in the above-mentioned embodiments there is provided only one stretched steel belt (8) to which the original film (5) is fixed, it is also possible to provide two parallel belts to which the respective sides of the original film (5) are fixed. In such a case, it is not necessary to keep the original film (5) lifted by compressed air from the air nozzles (11) since there is no possibility of contact between the original film and the photosensitive material (4) when the former is positioned on the latter.

Furthermore, although in the above-mentioned embodiments where it is arranged that the original film (5) is fixed directly onto the belt (8), when the original film is of small size, the original plate (5) may be positioned through a transparent base sheet. In such a case, it is preferred that the transparent base sheet be as thin as possible, as a matter of course.

It is to be understood that the form of this invention herein described is to be taken as a preferred example or examples of the same and that various changes in the shape, size and arrangement of parts may be resorted to without departing from the spirit of this invention or the scope of the appended claims.

What is claimed is:

1. An apparatus for printing images on discrete areas of a photosensitive material, comprising: a first conveyor mechanism for moving at least one original film reciprocatively in first linear directions, said first conveyor mechanism including a thin belt member, on which the film is supported, stretched between a pair of pulleys so as to run in longitudinal directions which exactly correspond with said first directions by rotation of said pulleys; a second conveyor mechanism for moving said first conveyor mechanism reciprocatively in second linear directions orthogonal to said first directions; first and second driving means for respectively driving said first and said second conveyor mechanism; an openable and closable frame provided with a light transmissive plate so as to bring the original film and said belt in close contact with the photosensitive material; a table provided so as to support the photosensitive material; and lighting means opposite to said table for exposing the photosensitive material supported thereon, the original film being positioned relative to the photosensitive material at a predetermined area where both the photosensitive material and the original film are contacted for an exposure.

2. An apparatus as defined in claim 1, wherein said belt member has two edges, said first conveyor mechanism further including guide members provided so as to contact both said belt member edges.

3. An apparatus as defined in claim 1, wherein said first conveyor mechanism further includes a pair of shafts provided so as to rotatably support each of said pulleys on a respective shaft so that said pulleys are axially movable on said shafts, said belt member being defined relative to said first directions.

4. An apparatus as defined in claim 2, wherein said guide members have respective peripheral surfaces rotatable in the running direction of said belt member.

5. An apparatus as defined in claim 3 or 4, wherein said guide members are arranged adjacent to said respective pulleys.

6. An apparatus as defined in claim 1, wherein said first conveyor mechanism is mechanically connected with said second conveyor mechanism, both said mechanisms cooperating to move the original film in X and Y directions relative to the photosensitive material.

7. An apparatus as defined in claim 1, wherein said first conveyor mechanism includes at least one bearing fixed thereto, said second conveyor mechanism including at least one ball screw provided so as to extend in said second linear directions, and engage said bearing of said first conveyor mechanism so that said first conveyor mechanism moves along said ball screw.

8. An apparatus as defined in claim 1; and further comprising a lifting mechanism movable vertically relative to the photosensitive material, said first conveyor mechanism being mechanically connected with said lifting mechanism.

9. An apparatus as defined in claim 1, wherein said table is provided so as to be lowerable relative to said first conveyor mechanism.

* * * * *